United States Patent Office 2,861,451
Patented Nov. 25, 1958

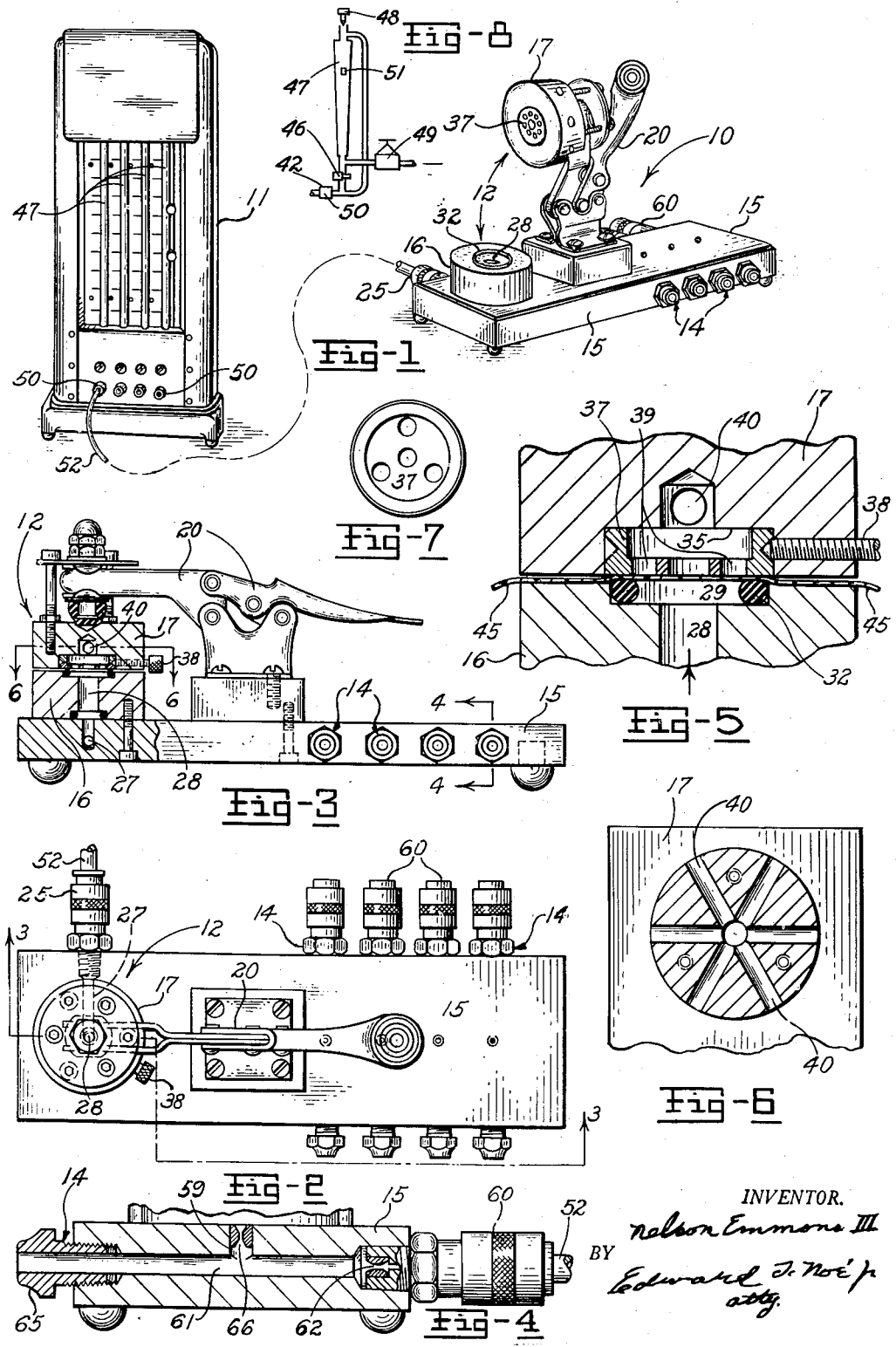

2,861,451

FLUID LEAKAGE GAUGING DEVICE

Nelson Emmons III, Dayton, Ohio, assignor, by mesne assignments, to The Sheffield Corporation, a corporation of Delaware Application November 29, 1954, Serial No. 471,559

9 Claims. (Cl. 73—38)

This invention relates to a gauging apparatus and more particularly to an apparatus for gauging the porosity of sheet materials.

It is an object of this invention to provide an apparatus for gauging the porosity of porous sheet materials, wherein air under regulated pressure is passed through a flow responsive indicating means and through a predetermined area of the porous sheet material to be gauged, interposed in a flow path leading to atmosphere, whereby an instantaneous indication of porosity is obtained by means of an apparatus which is simple in construction and operation and reliable for accurate gauging through a long service life.

It is a further object to provide such an apparatus wherein clamping means are closed about an interposed sheet of porous material, one of the clamping means providing a flow path leading from an indicating instrument and a source of air under pressure to one side of the sheet material, and the other clamping means providing a flow path leading from the opposite side of the sheet to atmosphere, sealing means being provided between the clamping means whereby sheets of material are easily inserted and removed during gauging and are sealably held transverse the flow path for porosity measurement.

It is a further object to provide such an apparatus wherein spaced openings are provided at the downstream side of the sheet material and sealing means cooperate between the clamping means about the spaced openings so that the entire flow through the fluid path to atmosphere passes through the sheet material, the spaced openings, and to atmosphere, the area of material through which the air passes being determined by the total area of the spaced openings, the openings and their relative spacing acting to support the sheet material and prevent its bulging, tearing and the like to insure accurate measurement of the rate of flow through a precise predetermined sheet area for porosity measurement.

It is a further object to provide a gauging unit comprising a gauging head of the air leakage type, and a controllable master formed by passages within the unit providing fluid restrictions through which air can be diverted as desired to obtain predetermined flow conditions for setup purposes corresponding to predetermined physical product characteristics, whereby an air gauge can be connected to the unit master and adjusted in accordance with the predetermined flow conditions provided thereby during setup, and can be connected to the gauging head of the unit for a gauging operation, thus providing in a single unit setup and gauging structure which can be rapidly utilized in an efficient manner.

It is a further object to provide a gauging apparatus for gauging an extremely wide range of product characteristics by means of characteristic controlled fluid leakage wherein provision is made for connecting a gauging head to any one of a number of indicating devices each of which is responsive to a predetermined portion of the possible range of product characteristics, the cumulative ranges of the indicating devices spanning the possible range of characteristics to be encounted in gauging.

It is a further object to provide an apparatus of the character referred to above, wherein controllable masters are provided for each of the indicating devices, each including flow restriction means through which air can be diverted as desired to obtain flow conditions corresponding to predetermined product characteristics for setup, each of the indicating devices being adapted for selective connection in a simple manner to either the gauging head or its respective master whereby an extremely wide range of gauging is possible in an apparatus which is simply and efficiently calibrated and set up for gauging.

Other objects and advantages of the invention will be apparent from the following description, the appended claims, and the accompanying drawing, in which, Figure 1 is a view in perspective of an apparatus for gauging the porosity of paper or the like embodying the present invention, Figure 2 is a plan view of the gauge head and master unit of Figure 1, Figure 3 is a sectional view on line 3—3 of Figure 2, Figure 4 is a sectional view on line 4—4 of Figure 3 and illustrates a controllable master for obtaining two float conditions in setup, Figure 5 is an enlarged detail of a clamping means for the porous sheet being gauged, Figure 6 is a sectional view through the exhaust passages to atmosphere taken on line 6—6 of Figure 3, Figure 7 is a removable perforated plate for supporting a predetermined area of the gauged material, and Figure 8 illustrates diagrammatically a flow circuit of an indicating instrument.

The particular gauging apparatus illustrated is one provided to measure the resistance to the passage of air of porous sheet materials such as paper or the like for determining the porosity of the material. Air under pressure is brought to one surface of the material and is prevented from edge leakage by means of a resilient sealing means. The material is supported at its opposite surface by a planar surface having a plurality of perforations of a predetermined total area. The air permeates through the paper and exhausts to atmosphere through the perforations. The rate of flow through the paper is instantaneously indicated by a rate of flow instrument connected to the system. As many readings as are desired can be taken on each sample because the test is non-destructive. As long as the sample is clamped in the fixture the reading will remain constant. Thus, it is not necessary to take rapid or instantaneous readings but indications are immediately provided and are maintained during the gauging period. All readings of the apparatus are instantaneous, accurate and repeatable.

The porous material is held in a clamping fixture which provides passages with restrictions through which air flow can be controllably diverted to obtain predetermined flow conditions. The passages are used as masters in setting up the amplification and indicator position of the associated indicating instrument.

The particular apparatus illustrated is one which will test the entire range of paper porosities likely to be encountered. It includes a series of indicating instruments, each of which is responsive to a predetermined range of paper porosity, the cumulative ranges including the entire range of porosities likely to be encountered. A controllable master is provided for each of the instruments and each of the instruments is adapted for connection to either the gauge head for setup or to its respective master for gauging.

By using plates of different total flow areas in the gauging head the total flow through a wide range of paper porosities can be maintained within the range of a single indicating instrument. A single master is then provided and a separate instrument scale for each of the replaceable plates is utilized.

A specific apparatus is illustrated comprising a gauging unit 10 and an indicating instrument 11. The gauging unit includes a gauge head 12, and a series of masters 14 formed in the unit base 15. The gauging head 12 includes a lower material supporting component or block 16 mounted on the base 15. An upper clamping block 17 cooperates with lower block 16 to clamp a sheet of porous material therebetween for gauging. This upper block 17 is supported and actuated for clamping by conventional toggle linkage indicated at 20. Air under controlled pressure is supplied from a suitable source and an indicating instrument through an inlet connection 25, and passage means 27 to the lower gauge head block 16. From the base passage 27 air flows up through a vertical passage 28 leading to a cylindrical depression 29 in the upper surface of the block 16. A resilient O ring 32 is carried in this cylindrical depression 29 along the outer periphery thereof and when the clamping blocks are opened, the O ring projects above the upper surface of the lower block 16.

The upper block 17 also has a cylindrical depression therein, as indicated at 35. A plate 37 is seated in this depression and clamped therein by a screw 38 projecting into an annular groove in the outer periphery of the plate. It will be noted that the plate 37 has a series of closely spaced perforations 39 through its central portion. Air passing through these perforations is conducted outward through passages 40 formed in the upper block 17 to atmosphere.

Figure 5 illustrates a portion of the apparatus with the upper and lower blocks 16 and 17 clamped about a sheet of material 45 for gauging the porosity thereof. It will be seen that the upward flow of air through passage 28 will impinge against the sheet of material and urge it against the lower planar surface of plate 37. The resilient O ring 32 engages and urges the paper against the imperforate outer portion of plate 37 to insure that all air passes up through the sheet of porous material 45 and through the perforations 39 in plate 37. The perforations in plate 37 perform two important functions. First, the total area determines the area of the sheet material through which the gauging air passes. Secondly, by providing the closely spaced and relatively small perforations the sheet material is supported for gauging without unnecessary bulging or tearing which would destroy the accuracy of the operation.

While the gauging head is adapted for use with any indicating device which is responsive to the leakage through the interposed sheet material, the instrument 11 is of a type which has been found particularly useful for such applications. In the exemplary application illustrated, the instrument contains four indicating columns, which are indicated at 47 in Figure 1. Each of the columns comprises an internally tapered transparent float tube containing an indicating float which positions along the tube in accordance with the velocity of flow upward through the tube. Such instruments are instantaneously responsive to changes in rate of flow.

The cabinet of the instrument 11 includes connection means adapted for connecting each of the tubes to a source of fluid under pressure and a regulator. Provision is made for adjusting the amplifications of each of the indicating tubes and the position of the float therealong during a setup or calibration operation. A series of connection means as indicated at 50 are provided at the forward face of the instrument 11, one for each of the tubes 47. The instrument arrangement and the adjustments provided therefore are of the nature disclosed in co-pending application No. 336,346 filed by Willis Fay Aller, February 11, 1953, now Patent No. 2,749,742.

Figure 8 illustrates diagrammatically the flow circuit of one of the tubes 47, including the regulator 49, indicating float 51 and amplification and float position adjustments 46 and 48.

Because of the wide range of porosities of papers likely to be encountered it is not practical that a single float tube 47 to be responsive to the entire range of flows through the gauging head 12 such as would be likely to occur. For that reason, a plurality of flow tubes 47 are provided, each of which is calibrated for response to a predetermined portion of the possible range of flows which will occur in gauging, the cumulative ranges of the tubes spanning the possible flow conditions and paper porosities likely to be encountered in the present example. A flexible conduit is indicated at 52 and this conduit has quick disconnect couplings at each end thereof of conventional construction for insertion into the inlet connection 25 of the gauge head 12 and either of the outlet connections 50 from the indicating tubes 47. Each of the flow tube outlet connections 50 are of a commercially available type comprising an automatic shutoff valve for closing off flow from the associated indicating tube when the conduit 52 is not connected thereto.

In gauging, one end of the conduit 52 will be connected to the inlet connection 25 of the gauging head, and the other end of the conduit successively connected to the outlet connections 50 until the proper flow tube is brought into the system as indicated by the response of the indicating float. By such an arrangement the indicating devices provided can be rapidly and efficiently inserted into the system for gauging an extremely wide range of product characteristics.

In order to set up the instrument 11 for gauging it is necessary to obtain two predetermined float conditions through the outlet connection of each of the indicating tubes 47. The flow conditions correspond to two predetermined product characteristics within the gauging range of the respective tube, and by successfully subjecting each tube to the two flow conditions, the amplification and indicating float adjustments can be made to properly calibrate the instrument for gauging.

In order to expedite and simplify this setup procedure controllable masters are provided in the base 15 of the gauging unit 10. Each of the masters 14 includes a quick disconnect coupling as indicated at 60. Thus, each of the masters can be connected through conduit 52 with its respective indicating tube 47. Each of the masters provides passage means formed integrally in the base 15 and restrictions of predetermined size through which the flow from the associated indicating tube can be diverted by application of the operator's finger to obtain two particular predetermined flow conditions.

Referring particularly to Figure 4 it will be seen that the master therein shown is typical and includes a longitudinal passage 61, and a lateral branch passage 59 both leading to atmosphere. When flow is free and unrestricted through the master a predetermined maximum flow condition is obtained as determined by restriction 62 inserted into the inner end of the longitudinal passage 61. A fitting 65 is provided at the outer end of passage 61 and when the operator places his finger over the end thereof, all flow is diverted through the lateral passage and a restriction 66 conditions the flow for a predetermined minimum flow condition. Thus closing off flow through fitting 65 and releasing it the operator can obtain two predetermined flow conditions so that the amplification and float position adjustments of the respective indicating tube can be utilized to calibrate the instrument. It will be seen that a unitary apparatus system has been provided including both a gauging head and controllable masters. Each of the indicating tubes 47 is adapted for connection to its corresponding master 14 for setup or calibration and to the gauging head 12 for gauging.

As previously noted, because of the wide range of possible paper porosities to be encountered and the resultant wide range of flows possible through the gauging head, it may not be practical to provide a single indicating instrument which will accurately indicate through such a range. However, as an alternative to providing a number of indicating devices for association with a single gauging head, it is possible to use perforated plates of different total flow areas to back up the porous sheet to thus vary the area of paper or porous material through which the air passes and maintain the flow within the range of response of a single tube. Figure 7 discloses a plate having fewer perforations therethrough which could be substituted for the plate 37 when gauging papers of a greater porosity to bring the flow within the indicating response of a single indicating device. When the perforated plates are substituted the calibrating scale utilized with the indicating instrument will have to be correspondingly replaced.

It has thus been seen that an apparatus has been provided for gauging the porosity of porous materials which has great speed in gauging, providing instantaneous readings and making it possible to take as many readings as desired on a single sample. Provision has been made for gauging an extremely wide range of possible material porosities. The apparatus is clean, no liquids are involved, and the apparatus is adapted for connection to available sources of air under pressure. Gauging operations can be immediately carried out without delay, and instantaneous readings are provided. As long as the same sample is clamped in the gauge head, the reading will remain constant. Through use of the simply controlled masters provided, the gauging unit is adapted for association with an indicating device for ready set up and gauging in a simple and efficient manner.

While the forms of apparatus herein described constitute preferred embodiments of the invention, it is to be understood that the invention is not limited thereto and that changes may be made therein without departing from the scope of the invention which is defined in the appending claims.

What is claimed is:

1. An apparatus for gauging the porosity of a flexible sheet of porous material, said apparatus comprising: a pressure regulator for continuously supplying air at a definite predetermined pressure and adapted for connection to a source of air under pressure, an instrument including indicating means instantaneously responsive to rate of flow, a gauging device, and conduit means placing said regulator, instrument, and gauging device in series communication in the order claimed, said gauging device providing an air flow path leading to atmosphere and including means for holding the sheet material for gauging and means cooperating therewith at the downstream side of the material supporting a predetermined area of porous sheet material across said flow path and in sealed relationship therewith, whereby the passage of fluid from the source and through the apparatus to atmosphere is determined by the porosity of a predetermined area of the material and is instantaneously indicated by said rate of flow indicating instrument.

2. An apparatus for gauging the porosity of a flexible sheet of porous material, said apparatus comprising: a pressure regulator for continuously supplying air at a definite predetermined pressure and adapted for connection to a source of air under pressure, an instrument including indicating means instantaneously responsive to rate of flow, a gauging device, and means placing said regulator, instrument, and gauging device in series communication in the order claimed, said gauging device providing an air flow path leading to atmosphere and including means for supporting a flexible sheet of porous material across said flow path and in sealed relationship therewith, said supporting means including means providing a planar surface at the downstream side of the material having spaced openings therethrough of a predetermined total area and against which the flexible sheet is urged by the air flow, whereby the sheet is supported against bulging and the passage of fluid from the source and through the apparatus to atmosphere is determined by the porosity of a predetermined area of the material and is instantaneously indicated by said rate of flow indicating instrument.

3. An apparatus for gauging the porosity of a sheet of porous material, said apparatus comprising: a pressure regulator for continuously supplying air at a definite predetermined pressure and adapted for connection to a source of air under pressure, an instrument including indicating means instantaneously responsive to rate of flow, a gauging device, and means placing said regulator, instrument, and gauging device in series communication in the order claimed; said gauging device comprising a pair of cooperating clamping means, a first of said clamping means having a passage therethrough in communication with the source of air under regulated pressure, the second of said clamping means having passage means therethrough of a predetermined area leading to atmosphere, means carrying said clamping means for relative movement to close the clamping means and said passages about an interposed sheet of porous material, whereby the passage of air from the source and through the apparatus to atmosphere is determined by the porosity of the material as instantaneously indicated by the rate of flow indicating instrument.

4. A device for gauging the porosity of a flexible sheet of porous material, said gauging device comprising a pair of cooperating clamping means, the first of said clamping means having a passage therethrough adapted for connection to a source of air under pressure and an indicating instrument, the second of said clamping means having a material engaging portion with an outer planar surface including a group of spaced openings of a predetermined total area which are in free communication with atmosphere at their downstream ends, means carrying said clamping means for relative movement to close the clamping means about an interposed sheet of porous material, sealing means carried by the clamping means and cooperating therebetween, whereby the flexible sheet to be gauged is urged by air flow against the planar surface and across the spaced openings, the passage of fluid from the source and through the passages of the gauging device to atmosphere being determined by the porosity of the interposed sheet of porous material as indicated by the associated instrument.

5. A device for gauging the porosity of a flexible sheet of porous material, said gauging device comprising a base, a lower sheet supporting block mounted on the upper surface of said base, a clamping block, means carrying said clamping block from said base for movement toward and from clamping engagement with said lower block, each of the blocks including passage means which are aligned when the blocks are clamped together, the passage means in one of said blocks leading to atmosphere and the passage means in the other of said blocks being adapted for connection to a source of air under pressure and an indicating instrument, a perforated plate supported in said one block at the upstream end of the passage to atmosphere, annular sealing means carried in the other of said blocks for engagement with the periphery of said perforated plate, whereby an interposed sheet of flexible material is urged against said perforated plate by the flow of air and the passage of air from the source and through the cooperating blocks to atmosphere is determined by the porosity of the interposed sheet material as indicated by the associated instrument.

6. A gauging head for gauging the porosity of a flexible sheet of porous material, said head comprising: a base, a lower material supporting block mounted on said base, said lower block having a flow passage therein opening through the upper surface thereof, an annular sealing means carried in the upper surface of said lower block about said flow passage and projecting above the upper surface of the lower block, an upper clamping block, means carrying said upper block from said base for movement toward and from the upper surface of the lower block, a plate mounted on the lower surface of the upper block, said plate having perforations therethrough of a predetermined total area, said upper block having passage means therein communicating with said perforations and leading through the block to atmosphere, the outer periphery of the plate being imperforate and adapted for cooperation with said annular sealing means, whereby a sheet of porous material to be gauged placed over the upper surface of the lower supporting block is sealably clamped between the annular sealing means and the plate periphery, the lower block passage means being adapted for connection to a source of air under controlled pressure and a flow responsive instrument, whereby during gauging the porous sheet is urged upward against the perforated plate by air flow and the flow upward through the gauging head and the predetermined area of the plate perforations is determined by the porosity of the material as indicated by the instrument.

7. An apparatus for gauging the porosity of a sheet of porous material, said apparatus comprising: a pressure regulator for continuously supplying air at a definite predetermined pressure and adapted for connection to a source of air under pressure, an instrument including indicating means instantaneously responsive to changes in rate of flow, a gauging device, and means placing said regulator, instrument, and gauging device in series communication in the order claimed; said gauging device comprising a base, a lower material supporting block mounted on said base, said lower block having a circular depression in its upper surface, passage means leading through said block and opening centrally into said cylindrical depression, said passage means being connected for receiving air under regulated pressure, an annular sealing ring seated in said depression along its outer periphery and extending above the upper surface of said lower block, a clamping block, means supporting said clamping block above said lower block for movement downward into clamping engagement with the lower block for gauging, said upper block including a depression in its lower face, a plate situated in said depression and having a plurality of perforations opening therethrough of a predetermined total area, said upper block including passage means leading from said perforations to atmosphere, whereby upon clamping the blocks about an interposed sheet of porous material the passages are placed in sealed communication through the sheet material by compression of the sealing ring against said plate about the plate perforations, the area of material through which fluid flow takes place being determined by the total area of the plate perforations, and the air flow through this predetermined area being determined by the porosity of the material as indicated by the rate of flow indicating instrument.

8. An apparatus for gauging the porosity of a flexible sheet of porous material comprising a pair of members carried for relative movement toward and from one another for clamping about an interposed sheet of porous material, one of said members having passage means adapted for connection to the source of air under pressure and an indicating instrument, the other of said members having sheet supporting means providing spaced openings, and sealing means cooperating between the members about the passage means, the openings in the sheet supporting means lying within the area defined by the sealing means, whereby the porous sheet is urged against the sheet supporting means by the air flow and the flow area of the sheet is determined by the total area of the openings.

9. An apparatus for gauging the porosity of a flexible sheet of porous material comprising a base, a pair of cooperating clamping means relatively movable on said base, one of said clamping means having passage means therein adapted for connection to a source of air under pressure, a plate detachably mounted on the second of said clamping means, said plate having openings therethrough of a predetermined total area in free communication with atmosphere, projecting sealing means on said first clamping means around the associated passage means, the periphery of said plate being imperforate and adapted for cooperation with said sealing means, means for closing said clamping means about an interposed sheet of porous material to sealably clamp the sheet between the sealing means and plate periphery, whereby during gauging the flexible sheet is urged against the perforated plate and the flow area is determined by the total area of the openings.

References Cited in the file of this patent

UNITED STATES PATENTS

| | | |
|---|---|---|
| 1,306,657 | Dezendorf | June 10, 1919 |
| 2,389,957 | Cox | Nov. 27, 1945 |
| 2,403,897 | Aller | July 16, 1946 |
| 2,465,002 | Aller | Mar. 22, 1949 |
| 2,594,046 | Mahlmeister | Apr. 22, 1952 |
| 2,618,151 | Leas | Nov. 18, 1952 |
| 2,659,433 | Brown | Nov. 17, 1953 |
| 2,696,730 | Justice | Dec. 14, 1954 |
| 2,790,320 | Salko et al. | Apr. 30, 1957 |

OTHER REFERENCES

Publication: "Paper Testing Instruments," Instruments, vol. VI, January 1933, page 22.

Bureau of Standards, R. P. 681, May 1923, "Sensitive Instruments for Measuring Permeability," pages 571, 572, 573 and Fig. 2.